US011375096B2

(12) United States Patent
Yamaguchi

(10) Patent No.: US 11,375,096 B2
(45) Date of Patent: Jun. 28, 2022

(54) AUTHENTICATING IMAGES FROM A PLURALITY OF IMAGING UNITS

(71) Applicant: CANON KABUSHIKI KAISHA, Tokyo (JP)

(72) Inventor: Takashi Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/331,229

(22) Filed: May 26, 2021

(65) Prior Publication Data

US 2021/0377429 A1    Dec. 2, 2021

(30) Foreign Application Priority Data

Jun. 2, 2020    (JP) .............................. JP2020-096371

(51) Int. Cl.
| | | |
|---|---|---|
| *H04N 5/225* | (2006.01) | |
| *H04N 1/00* | (2006.01) | |
| *H04N 5/232* | (2006.01) | |
| *H04N 5/247* | (2006.01) | |

(52) U.S. Cl.
CPC ....... *H04N 5/2258* (2013.01); *H04N 1/00095* (2013.01); *H04N 5/23229* (2013.01); *H04N 5/247* (2013.01); *H04N 2201/0084* (2013.01)

(58) Field of Classification Search
CPC combination set(s) only.
See application file for complete search history.

(56) References Cited

U.S. PATENT DOCUMENTS

| | | | |
|---|---|---|---|
| 2002/0063711 | A1 | 5/2002 | Park et al. |
| 2013/0120602 | A1* | 5/2013 | Huang ................. H04N 5/2628 |
| | | | 348/E5.024 |
| 2014/0146202 | A1 | 5/2014 | Boss et al. |
| 2019/0182244 | A1 | 6/2019 | Sarda et al. |
| 2021/0279469 | A1* | 9/2021 | Holland ........... H04N 5/232122 |

FOREIGN PATENT DOCUMENTS

| | | |
|---|---|---|
| CN | 110650321 A | 1/2020 |
| EP | 2760195 A1 | 7/2014 |
| EP | 2840776 A1 | 2/2015 |
| JP | 2000-196984 A | 7/2000 |
| WO | 2020/093757 A1 | 5/2020 |

* cited by examiner

*Primary Examiner* — Paul M Berardesca
(74) *Attorney, Agent, or Firm* — Canon U.S.A., Inc. IP Division

(57) ABSTRACT

A processing apparatus is configured to process image data from an image pickup apparatus that includes a first imaging unit and a second imaging unit. The processing apparatus includes an acquisition unit configured to acquire information on first image data acquired by the first imaging unit, and a processing unit configured to process second image data acquired by the second imaging unit so that the information on the first image data is collateral with the second image data.

8 Claims, 5 Drawing Sheets

AUTHENTICATING IMAGES FROM A PLURALITY OF IMAGING UNITS

BACKGROUND

Field of the Disclosure

The present disclosure relates to a processing apparatus, an image pickup apparatus, and a processing method.

Description of the Related Art

Multi-eye wearable cameras that can image the surroundings of a wearer with a plurality of imaging units have recently been proposed. When this image pickup apparatus is used, for example, to image a working status at a construction site or to image a crime scene, a recorded image must be tamperproof and authentic a certain time after imaging. Japanese Patent Laid-Open No. ("JP") 2000-196984 discloses a camera that inseparably superimposes incidental or collateral information, such as time and a location on a captured image, on image information in order to prevent a captured image from being tampered with or counterfeited.

The camera disclosed in JP 2000-196984 can prevent the captured images acquired by each of the plurality of imaging units from being tampered with, but data of all captured images acquired by the plurality of imaging units cannot be prevented from being tampered with or counterfeited, such as changing a display timing of each captured image, in outputting them at the same time.

SUMMARY

Embodiments of the present disclosure provide a processing apparatus, an image pickup apparatus, and a processing method, each of which can prevent data from being tampered with or counterfeited for all captured images acquired by a plurality of imaging units.

A processing apparatus according to embodiments of the present disclosure is configured to process image data from an image pickup apparatus that includes a first imaging unit and a second imaging unit. The processing apparatus includes an acquisition unit configured to acquire information on first image data acquired by the first imaging unit, and a processing unit configured to process second image data acquired by the second imaging unit so that the information on the first image data is collateral with the second image data. At least one processor is configured to perform functions of the acquisition unit and the processing unit.

An image pickup apparatus according to embodiments of the present disclosure includes a first imaging unit, and a second imaging unit disposed so as to face an imaging direction different from that of the first imaging unit, an acquisition unit configured to acquire information on first image data acquired by the first imaging unit, and a processing unit configured to process second image data acquired by the second imaging unit so that the information on the first image data is collateral with the second image data. At least one processor is configured to perform functions of the acquisition unit and the processing unit.

A processing method according to embodiments of the present disclosure for processing image data from an image pickup apparatus that includes a first imaging unit and a second imaging unit includes the steps of acquiring information on first image data acquired by the first imaging unit, and processing second image data acquired by the second imaging unit so that the information on the first image data is collateral with the second image data.

Further features of the present disclosure will become apparent from the following description of exemplary embodiments with reference to the attached drawings.

DESCRIPTION OF THE EMBODIMENTS

Figure 1:
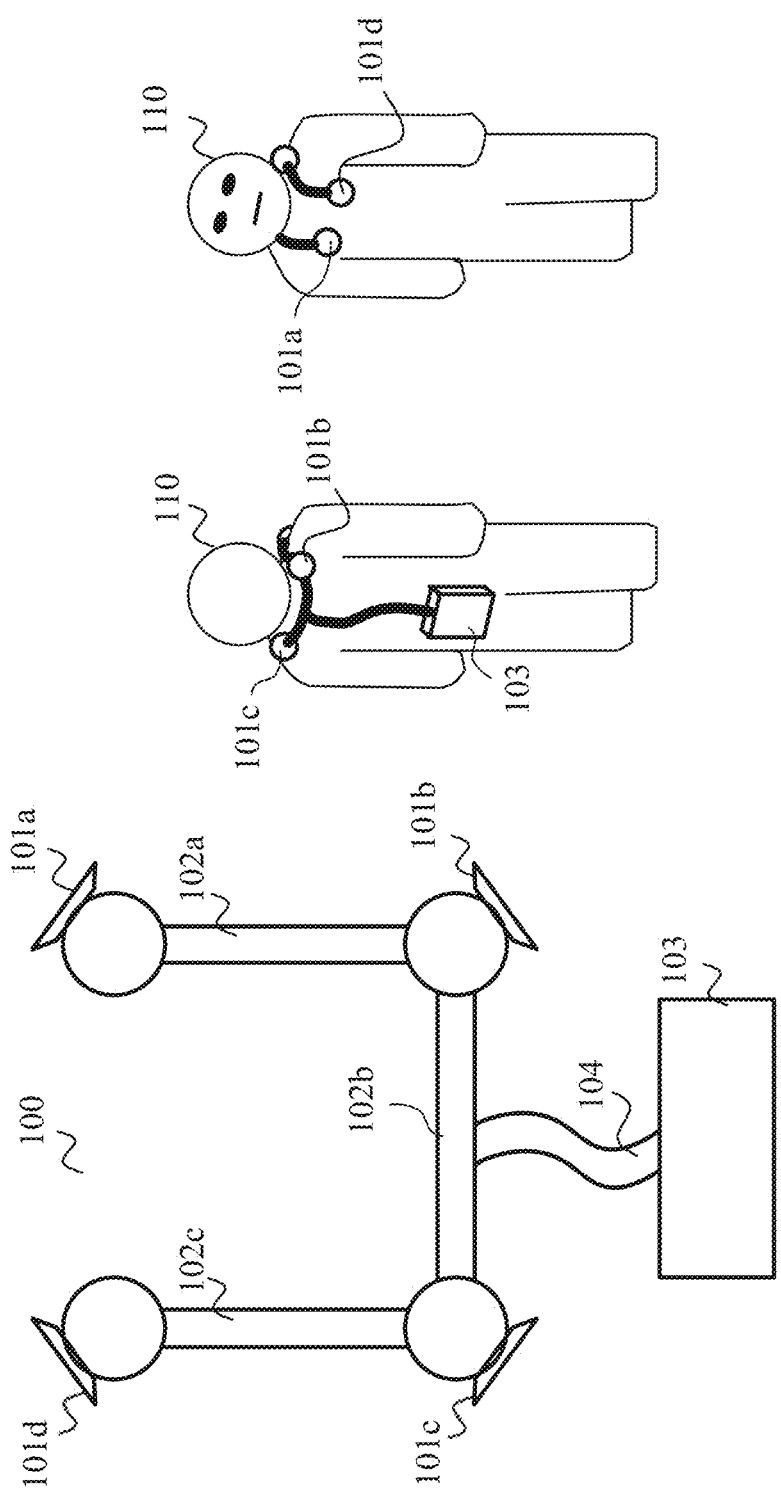
FIGS. 1A to 1C explain an image pickup apparatus according to one embodiment of the present disclosure.

Referring now to the accompanying drawings, a detailed description will be given of embodiments according to the present disclosure. Corresponding elements in respective figures will be designated by the same reference numerals, and a duplicate description thereof will be omitted.

FIGS. 1A to 1C explain an image pickup apparatus 100 according to one embodiment of the present disclosure. FIG. 1A is an external view of the image pickup apparatus 100. FIGS. 1B and 1C are rear and front views of a wearer 110 wearing the image pickup apparatus 100, respectively.

The image pickup apparatus 100 includes a plurality of imaging units 101a to 101d (collectively referred to as "imaging units 101" hereinafter). The plurality of imaging units 101a to 101d are disposed so as to face different imaging directions so that the surroundings of the wearer 110 can be imaged. This embodiment arranged the four imaging units so as to face imaging directions that are different from one another by every 90° so as to provide 360° imaging, but the present disclosure is not limited to this example. The number of imaging units may be two or more, and the imaging direction may be any direction.

A coupler 102a connects the imaging units 101a and 101b to each other. A coupler 102b connects the imaging units 101b and 101c to each other. A coupler 102c connects the imaging units 101c and 101d to each other. When the wearer 110 wears the image pickup apparatus 100, the couplers 102a and 102c are stably fixed by the shoulders of the wearer 110. In the following description, the couplers 102a to 102c will be collectively referred to as "couplers 102."

A cable 104 is provided to the coupler 102b and propagates an electric signal to a control unit 103. The imaging unit 101 and the control unit 103 are communicable various signals via the couplers 102 and the cable 104. For example, a video signal captured by the imaging unit 101 and an imaging parameter for the imaging unit 101 are timely communicated.

The control unit 103 is stably fixed around the waist of the wearer 110 by an unillustrated fixing member.

Figure 2:
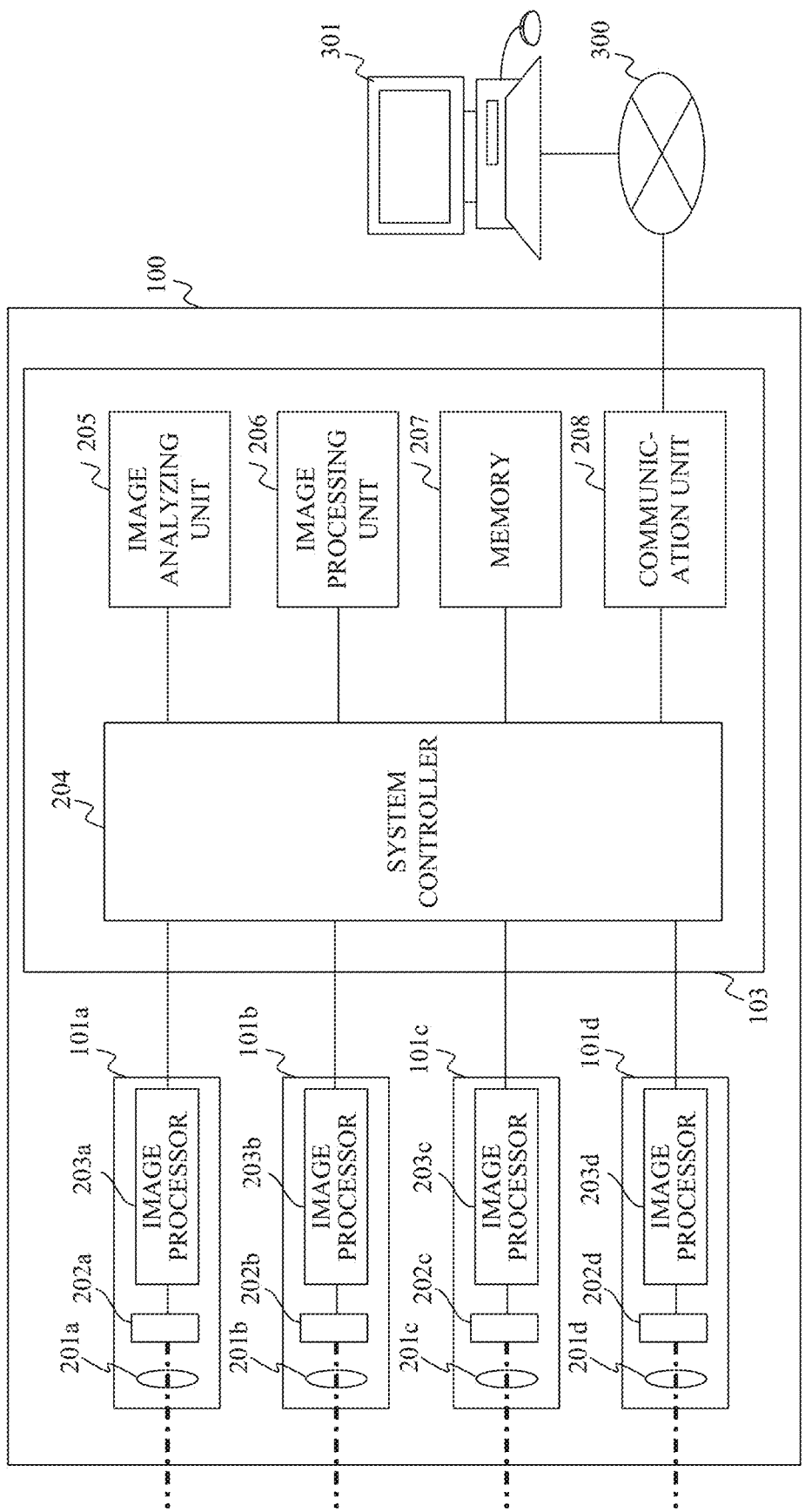
FIG. 2 is a block diagram of the image pickup apparatus.

FIG. 2 is a block diagram of the image pickup apparatus 100. The imaging units 101a to 101d have imaging optical systems 201a to 201d, image sensors 202a to 202d, and image processors 203a to 203d, respectively. In the following description, imaging optical systems 201a to 201d will be collectively referred to as "imaging optical systems 201." The image sensors 202a to 202d will be collectively referred to as "image sensors 202." The image processors 203a to 203d will be collectively referred to as "image processors 203."

The imaging optical system 201 includes a plurality of lenses and holding members (not shown), but is not limited to this example. The imaging optical system 201 may have a motor for driving a lens and may adjust zoom and focus positions, or may condense light containing a plurality of wavelength components such as visible light and infrared light.

Light transmitted through the imaging optical system 201 is imaged by the image sensor 202 and converted into an electric visible light signal. The visible light signal output from the image sensor 202 is transmitted to the image processor 203. In this embodiment, the image sensor 202 has sensitivity to light in the visible light area, but is not limited to this example, and may have sensitivity to nonvisible light area such as infrared light.

The control unit (processing apparatus) 103 includes a system controller (control unit) 204, an image analyzing unit (acquisition unit) 205, an image processing unit (processing unit) 206, a memory 207, and a communication unit 208.

The image processor 203 performs various image processing, such as development processing, color balance processing, gamma processing, and noise reduction processing, for the visible light signal to generate image data. The image data output from the image processor 203 is transmitted to the image analyzing unit 205 via the system controller 204.

The image analyzing unit 205 performs various analyzes for the acquired image data and acquires information (image evaluating value) on the image data. In this embodiment, the image analyzing unit 205 calculates a color average value in a predetermined area of the image data. However, the present disclosure is not limited to this example. The image analyzing unit 205 may calculate, for example, an average luminance value, or may acquire information on another color and a luminance value. The image analyzing unit 205 may generate a histogram or the like instead of the average value.

The image processing unit 206 processes the image data based on the instruction from the system controller 204. In this embodiment, the image processing unit 206 generates a processed image in which a specific color or character is superimposed on a predetermined area of image data or combining processing is performed.

The processed image is temporarily stored in the memory 207 and transmitted to the client device 301 via the communication unit 208. In this embodiment, the memory 207 is, but not limited to, an SD card, and may be a recording medium such as a USB flash memory or a nonportable recording medium.

The communication unit 208 converts the processed image pursuant to the communication protocol, and then transmits the processed image to a client device 301 via a network 300. More specifically, the communication unit 208 performs compression coding processing such as H. 264 and H. 265. The communication unit 208 receives various parameter setting commands and the like for the image pickup apparatus 100 from the client device 301 and outputs them to the system controller 204, and simultaneously transmits a response to the client device 301.

The network 300 includes a LAN (Local Area Network) on the network, and includes a router, a switch, a cable, and the like that satisfy the communication standard such as Ethernet (registered trademark). The image pickup apparatus 100 is connectible to an external device such as the client device 301, another image pickup apparatus, and a server via the network 300. The network 300 may have any communication standard, scale, and configuration as long as it can provide a communicate between the image pickup apparatus 100 and the client device 301. For example, the LAN may be composed of a wired LAN, a wireless LAN, a WAN (Wide Area Network), or the like. The network 300 may be configured via the cloud on the network.

The client device 301 is a PC (personal computer), a mobile terminal, or the like, and can communicate with the image pickup apparatus 100 via the network 300. The client device 301 can receive, display, and record an image from the image pickup apparatus 100 by using a control tool (not shown). The client device 301 can transmit various setting commands for controlling the image pickup apparatus 100, and the client device 301 can acquire information of the image pickup apparatus 100 by receiving the response output from the communication unit 208.

The system controller 204 includes a CPU, an unillustrated memory, and the like, and integrally controls each component of the image pickup apparatus 100 and sets various parameters. The memory is used as a program storage area executed by the system controller 204 and a work area while the program is executed, and the system controller 204 holds initial values of various parameters for controlling each component in the image pickup apparatus 100.

Figure 3:
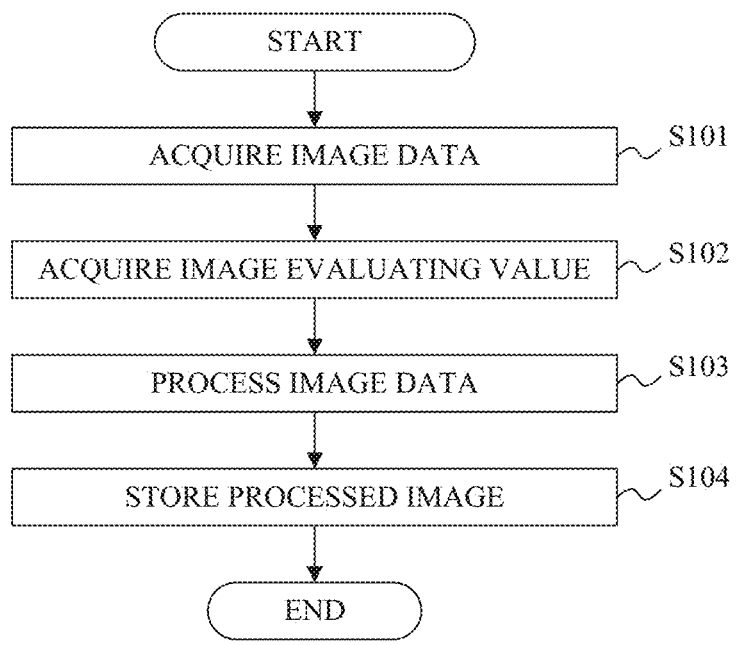
FIG. 3 is a flowchart showing processing from an acquisition of image data to recording of a processed image.
Figure 4:
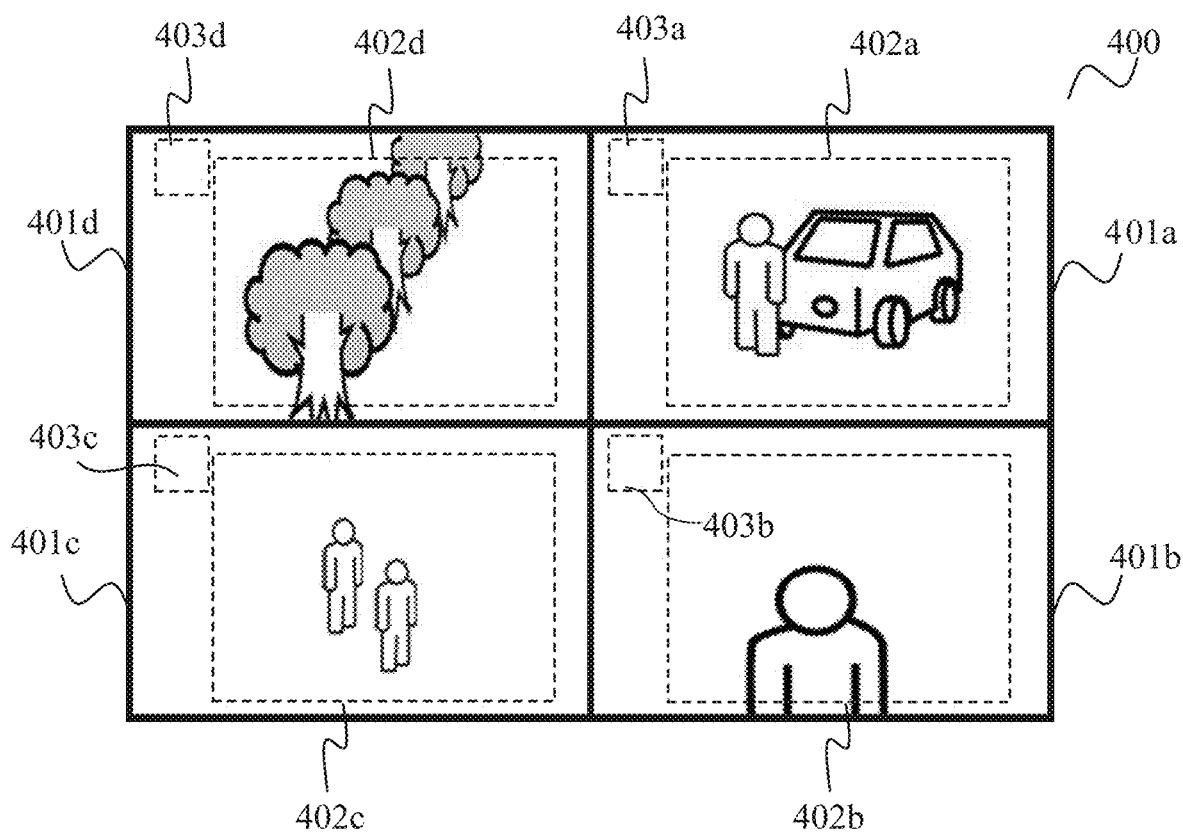
FIG. 4 shows illustrative image data.
Figure 5:
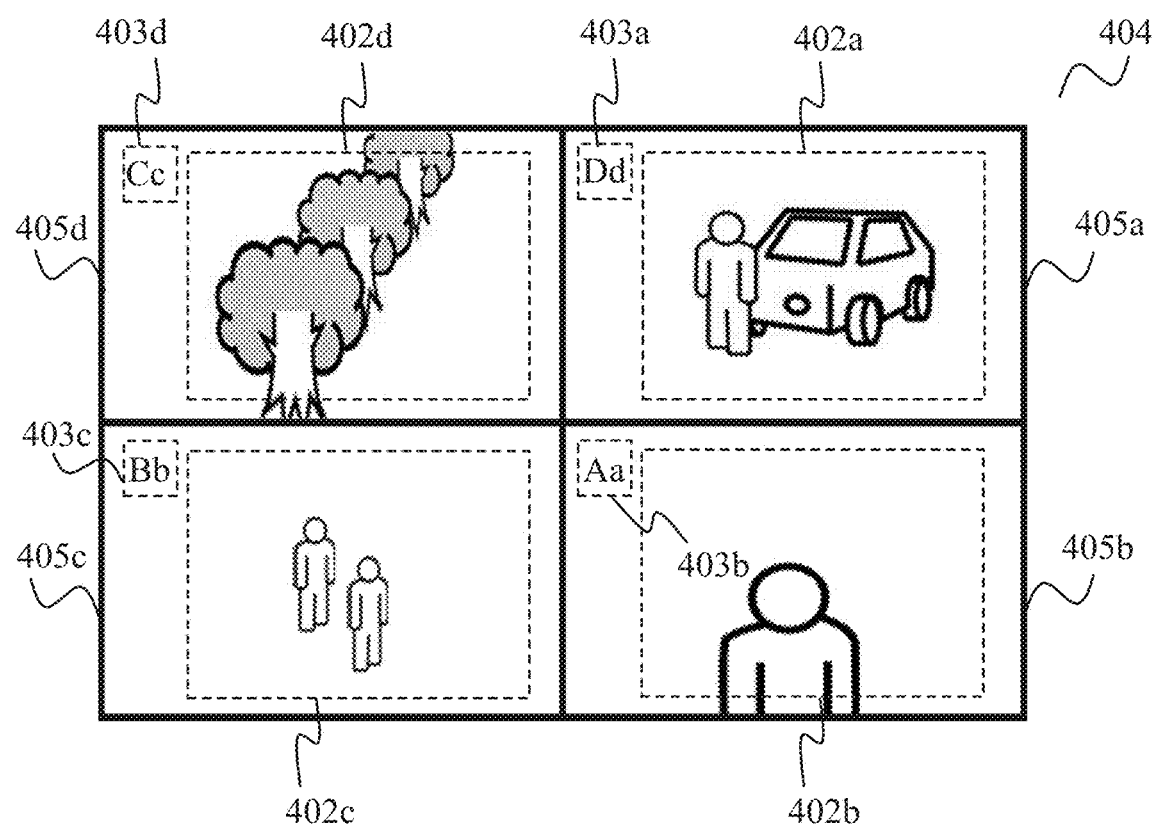
FIG. 5 shows an illustrative processed image.

FIG. 3 is a flowchart showing processing from an acquisition of the image data to recording of the processed image performed by the system controller 204. FIG. 4 shows illustrative image data 400 output from the imaging unit 101. FIG. 5 shows an illustrative processed image 404 stored in the memory 207.

In the step S101, the system controller 204 acquires image data 400 from the imaging unit 101. The image data 400 includes output images 401a to 401d from the imaging units 101a to 101d. Image analyzing areas 402a to 402d and image processing areas 403a to 403d are predetermined in the output images 401a to 401d, respectively. The image analyzing area and the image processing area may have any position, shape, and size, and are not limited to ranges shown in FIG. 4.

In the step S102, the system controller 204 acquires the image evaluating values in the image analyzing areas 402a to 402d from the image analyzing unit 205. In this embodiment, the image analyzing unit 205 calculates the color mean value as the image evaluating values in the image analyzing areas 402a to 402d. The image analyzing unit 205 may calculate, for example, an average luminance value, information on other colors and luminance values, and the like, instead of the color average value. The image analyzing unit 205 may generate a histogram instead of the average value.

In the step S103, the system controller 204 causes the image processing unit 206 to process the image processing areas 403a to 403d using the image evaluating values acquired in the step S102. In this embodiment, the image processing unit 206 uses the color mean values in the image analyzing areas 402a to 402d to perform predetermined processing for the image processing areas 403a to 403d in the output image that is not the corresponding output image. For example, the image processing unit 206 processes the image processing area 403b in the output image 401b by using the color average value in the image analyzing area 402a in the output image 401a. Similarly, the image processing unit 206 processes the image processing areas 403c, 403d, and 403a using the color average values in the image analyzing areas 402b, 402c, and 402d. The combination of the image analyzing area and the image processing area is not limited to the above example, and may use any combination.

In this embodiment, the image processing unit 206 describes the color average value as numerical data in the target image processing area. For example, (red, green, blue)=(64, 128, 192) is displayed so as to overwrite the image data 400. The processing method of the image processing area is not limited to this example. For example, the color in the image processing area may be changed so that the color becomes the same as the color average value, or a hash value using a hash function may be described. The image evaluating value may be expressed by an arbitrary method such as a superimposition or combination, instead of overwriting the image data 400.

In the step S104, the system controller 204 stores the generated processed image 404 in the memory 207.

Figure 6:
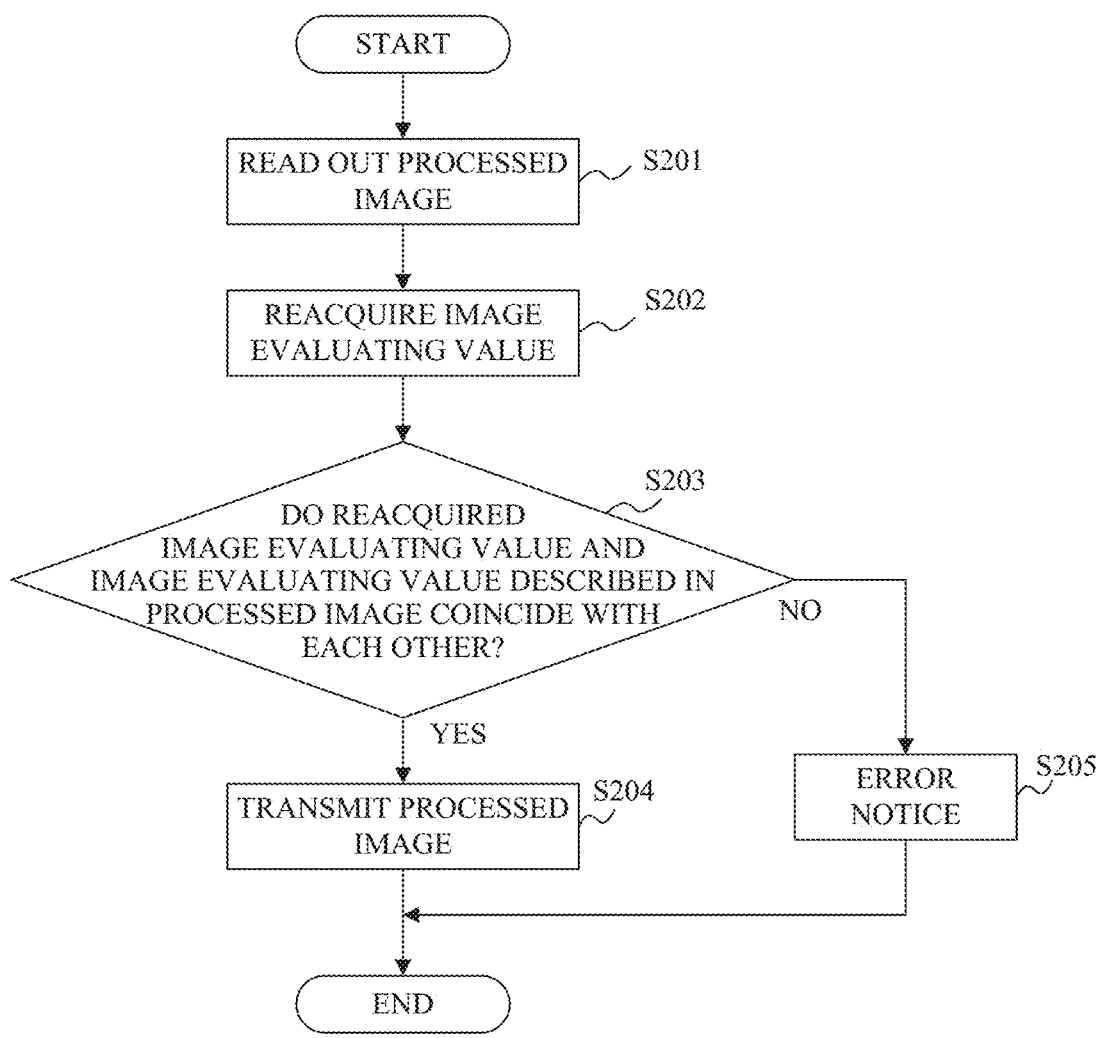
FIG. 6 is a flowchart showing processing until a processed image is transmitted to a client device.

FIG. 6 is a flowchart showing processing performed by the system controller 204 until the processed image 404 is transmitted to the client device 301.

In the step S201, the system controller 204 reads out the processed image 404 stored in the memory 207.

In the step S202, the system controller 204 reacquires the image evaluating values in the image analyzing areas 402a to 402d from the image analyzing unit 205.

In the step S203, the system controller 204 determines whether or not the image evaluating value reacquired in the step S202 coincides with the image evaluating value described in the processed image 404. If they coincide with each other, the flow proceeds to the step S204, and if they do not coincide with each other, the flow proceeds to the step S205.

In the step S204, the system controller 204 transmits the processed image 404 to the client device 301.

In the step S205, the system controller 204 transmits an error notice to the client device 301 and interrupts the transmission of the processed image 404. The error notice may include information that the data does not coincide with each other, information that the data may have been tampered with, or the like.

In this way, the image evaluating value in the first output image collateral with the second output image can demonstrate the authenticity of mutual image data a certain time after imaging. For example, when the reacquired image evaluating value and the evaluation value displayed on the processed image do not coincide with each other, it is highly likely that one of the output images has been edited, and a tamper of the data is detectable.

This embodiment detects a tamper of data by the system controller 204 when the processed image is transmitted, but the present disclosure is not limited to this example. For example, a control unit (not shown) in the client device 301 may perform the image analysis and data collation.

This embodiment transmits the information on the authenticity of the image data to the external device, but may display it on a display unit (not shown) of the image pickup apparatus 100.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can provide a processing apparatus, an image pickup apparatus, and a processing method, each of which can prevent data from being tampered with or counterfeited for all captured images acquired by a plurality of imaging units.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-096371, filed on Jun. 2, 2020, which is hereby incorporated by reference herein in its entire.

What is claimed is:

1. A processing apparatus comprising:
an acquisition unit configured to acquire information on first image data acquired by a first imaging unit; and
a processing unit configured to process second image data acquired by a second imaging unit so that the information on the first image data is collateral with the second image data,
wherein when information on the first image data reacquired from the acquisition unit and the information on the first image data collateral with the second image data coincide with each other, the second image data is transmitted to an external device,
wherein when information on the first image data reacquired from the acquisition unit and the information on the first image data collateral with the second image data do not coincide with each other, the second image data is not transmitted to the external device, and
wherein at least one processor is configured to perform functions of the acquisition unit and the processing unit.

2. The processing apparatus according to claim 1, wherein when information on the first image data reacquired from the acquisition unit and the information on the first image data collateral with the second image data do not coincide with each other, an error notice is transmitted to the external device.

3. The processing apparatus according to claim 1, wherein the information on the first image data includes information on a color in a predetermined area of the first image data.

4. The processing apparatus according to claim 1, wherein the information on the first image data includes information on a luminance value in a predetermined area of the first image data.

5. The processing apparatus according to claim 1, wherein the first image data includes a first image analyzing area and a first image processing area,
wherein the second image data includes a second image analyzing area and a second image processing area,
wherein the acquisition unit acquires information on the first image analyzing area, and
wherein the processing unit processes the second image processing area using the information on the first image analyzing area.

6. The processing apparatus according to claim 1, wherein the second imaging unit is disposed so as to face an imaging direction different from that of the first imaging unit.

7. A processing method comprising:
acquiring information on first image data acquired by a first imaging unit; and
processing second image data acquired by a second imaging unit so that the information on the first image data is collateral with the second image data,
wherein when information on the first image data reacquired from the acquiring step and the information on the first image data collateral with the second image data coincide with each other, the second image data is transmitted to an external device, and
wherein when information on the first image data reacquired from the acquiring step and the information on the first image data collateral with the second image data do not coincide with each other, the second image data is not transmitted to the external device.

8. A non-transitory computer-readable storage medium storing a program for causing a computer to execute a processing method, the processing method comprising:
acquiring information on first image data acquired by a first imaging unit; and
processing second image data acquired by a second imaging unit so that the information on the first image data is collateral with the second image data,
wherein when information on the first image data reacquired from the acquiring step and the information on the first image data collateral with the second image data coincide with each other, the second image data is transmitted to an external device, and
wherein when information on the first image data reacquired from the acquiring step and the information on the first image data collateral with the second image data do not coincide with each other, the second image data is not transmitted to the external device.

* * * * *